United States Patent
Lee et al.

(10) Patent No.: US 9,865,223 B2
(45) Date of Patent: Jan. 9, 2018

(54) OPTOELECTRONIC MODULATION STACK

(71) Applicants: HannStar Display (Nanjing) Corporation, Nanjing (CN); HANNSTAR DISPLAY CORPORATION, Taipei (TW)

(72) Inventors: Hsing-Ying Lee, Taipei (TW); Da-Ching Tang, Taipei (TW); Tien-Rong Lu, Taipei (TW)

(73) Assignees: Hannstar Display (Nanjing) Corporation, Nanjing (CN); Hannstar Display Corporation, Taipei (TW)

( * ) Notice: Subject to any disclaimer, the term of this patent is extended or adjusted under 35 U.S.C. 154(b) by 44 days.

(21) Appl. No.: 14/713,869

(22) Filed: May 15, 2015

(65) Prior Publication Data
US 2016/0034075 A1    Feb. 4, 2016

(30) Foreign Application Priority Data
Jul. 29, 2014    (CN) .......................... 2014 1 0364810

(51) Int. Cl.
*G09G 5/00*    (2006.01)
*G06F 3/041*    (2006.01)
*G06F 3/044*    (2006.01)

(52) U.S. Cl.
CPC ............. *G09G 5/003* (2013.01); *G06F 3/041* (2013.01); *G06F 3/044* (2013.01); *G09G 2300/0426* (2013.01)

(58) Field of Classification Search
CPC ................... G06F 3/0412; G06F 3/044; G06F 2203/04103
See application file for complete search history.

(56) References Cited

U.S. PATENT DOCUMENTS

| | | | |
|---|---|---|---|
| 2004/0063041 A1 | 4/2004 | Lu | |
| 2005/0139817 A1* | 6/2005 | Choi | B82Y 10/00 257/10 |
| 2014/0078417 A1* | 3/2014 | Lee | G06F 3/0412 349/12 |
| 2014/0204048 A1* | 7/2014 | Lai | G06F 3/044 345/174 |

(Continued)

FOREIGN PATENT DOCUMENTS

| | | |
|---|---|---|
| CN | 101488066 A | 7/2009 |
| CN | 101989016 A | 3/2011 |

(Continued)

*Primary Examiner* — Gerald Johnson
(74) *Attorney, Agent, or Firm* — Muncy, Geissler, Olds & Lowe, P.C.

(57) ABSTRACT

An optoelectronic modulation stack includes a substrate, a plurality of touch sensing units, at least a first anti-interference spot and a nano-structural layer. The touch sensing units are coplanarly disposed on the substrate, and a first interval region is formed between the adjacent touch sensing units. The first anti-interference spot is disposed within the first interval region, and the width of the first anti-interference spot is substantially less than that of the substrate or touch sensing unit. The nano-structural layer is disposed below the first anti-interference spot and includes a plurality of nano structures. When the light passes through the nano structures and the first anti-interference spot, the optical characteristic of the light is changed.

20 Claims, 4 Drawing Sheets

(56) References Cited

U.S. PATENT DOCUMENTS

2015/0227234 A1* 8/2015 Mu .................. G06F 3/044
                                                    345/174
2015/0378489 A1* 12/2015 Park .................. G02F 1/13439
                                                    427/553

FOREIGN PATENT DOCUMENTS

| CN | 102445805 A | 5/2012 |
| CN | 103135821 A | 6/2013 |
| CN | 103246409 A | 8/2013 |
| CN | 103293785 A | 9/2013 |
| CN | 103702518 A | 4/2014 |
| CN | 103713785 A | 4/2014 |
| CN | 103941900 A | 7/2014 |

* cited by examiner

OPTOELECTRONIC MODULATION STACK

CROSS REFERENCE TO RELATED APPLICATIONS

This Non-provisional application claims priority under 35 U.S.C. §119(a) on Patent Application No(s). 201410364810.5 filed in People's Republic of China on Jul. 29, 2014, the entire contents of which are hereby incorporated by reference.

BACKGROUND OF THE INVENTION

Field of Invention

The invention relates to a modulation stack and, in particular, to an optoelectronic modulation stack.

Related Art

Recently, the touch technology has been widely applied to the consumer electronic products such as mobile phones, digital cameras, MP3, PDA, GPS, hand-held PC and UMPC (ultra mobile PC). However, the conventional touch sensing structure suffered the problem of a decreasing product yield.

A conventional touch sensing stack includes a substrate and a plurality of touch sensing units. The touch sensing units are disposed on the substrate and used to generate electric signals by sensing the touch of users, and therefore the touch coordinates of the user can be obtained after the electric signal process. However, since there is the interval just of 10 μm~30 μm between the touch sensing units, the adjacent touch sensing units will be easily short-circuited when particles fall down, scratches happen or the touch sensing devices is bending during the process. As a result, the malfunction of touch product happens and the product yield will be decreased.

Moreover, in a conventional art (disclosed by US patent No. 20040063041A), the substrate is configured with an anti-glare polyimide layer to provide the anti-glare effect against the incident light. Hence, it is an important subject how to apply the anti-glare function to the touch sensing display, and besides, it is also important to enhance the light output for the light-emitting device or display device.

Therefore, an optoelectronic modulation stack is developed to solve the above-mentioned short circuit problems and improve the touch function, product yield, light output characteristics and product competitiveness.

SUMMARY OF THE INVENTION

In view of the foregoing, the invention relates, in one embodiment, to provide an optoelectronic modulation stack whereby the short circuit problem can be solved and the touch function, product yield, light output characteristics and product competitiveness can be enhanced.

An optoelectronic modulation stack of this invention includes a substrate, a plurality of touch sensing units, at least a first anti-interference spot and a nano-structural layer. The touch sensing units are coplanarly disposed on the substrate, and a first interval region is formed between the adjacent touch sensing units. The first anti-interference spot is disposed within the first interval region, and the width of the first anti-interference spot is substantially less than that of the substrate or touch sensing unit. The nano-structural layer is disposed below the first anti-interference spot and includes a plurality of nano structures. When the light passes through the nano structures and the first anti-interference spot, the optical characteristic of the light is changed.

In one embodiment, the first anti-interference spot exhibits a zigzag pattern.

In one embodiment, the optoelectronic modulation stack further comprises a grounding unit and at least a second anti-interference spot. The grounding unit is disposed coplanarly with the touch sensing units, and the grounding unit and the adjacent touch sensing unit have a second interval region therebetween. The second anti-interference spot is disposed within the second interval region, and the width of the second anti-interference spot is substantially less than that of the substrate or touch sensing unit. The nano-structural layer is further disposed below the second anti-interference spot.

In one embodiment, by the first anti-interference spot disposed within the first interval region formed by the adjacent touch sensing units, the interval between the adjacent touch sensing units is increased, the short circuit is prevented even if the particle pollution is caused during the subsequent process, so as to provide the electrical anti-interference effect.

In one embodiment, the subsequent process at least includes a mechanical thinning process, a chemical thinning process, a chemical-mechanical thinning process, a photo-lithography process, a thin film deposition process and/or a thin film etching process.

In one embodiment, the optoelectronic modulation stack further comprises an insulating layer possessing the anti-glare ability.

In one embodiment, the substrate is a flexible substrate or a rigid substrate.

In one embodiment, the nano structures include nano copper or nano silver.

In one embodiment, the nano-structural layer further includes a medium where the nano structures are disposed.

In one embodiment, the medium and the nano structures have different refractive indexes.

As mentioned above, in the optoelectronic modulation stack of this invention, the first anti-interference spot is disposed in the first interval region formed by the adjacent touch sensing units, and thereby the interval between the touch sensing units is increased, for example, to 70 μm~130 μm from the original 10 μm~30 μm. Hence, even if the particles fall down or the scratch is caused during the process, the adjacent touch sensing units won't be short-circuited. Therefore, the first anti-interference spots provide the electrical anti-interference effect, so as to prevent the malfunction of the touch product and enhance the product yield and flexibility.

Furthermore, the touch sensing units may make the human eyes perceive the existence of the touch sensing units, but because the first anti-interference spot with a zigzag pattern is disposed between the adjacent touch sensing units, the touch sensing units will become invisible and the human eyes will not easily perceive their existence, so as to provide the optical anti-interference effect and enhance the display efficiency. Besides, the first anti-interference spots combined with the curved edge of the substrate can further enhance the optical anti-interference effect and the 3D display efficiency can be enhanced thereby.

Moreover, when the light emitted by the display module passes through the nano-structural layer and the anti-interference spots, the optical characteristic of the light is changed due to the disposition of the nano-structural layer, wherein for example, the mura, moire and haze are eliminated and the viewing angle is increased, so as to provide the optical anti-interference effect and also prevent the short circuit to provide the electrical anti-interference effect even if the particles are caused during the process.

In addition, the insulating layer of this invention possesses the anti-glare ability so as to absorb and filter the external incident light to reduce the reflection and interference effect caused by the incident light and the metal mesh, and therefore the brightness contrast of the display panel can be enhanced and the anti-glare effect against the external incident light can be achieved.

Moreover, by using the nanomaterial, this invention has advantages such as low wire junction resistance, smooth surface, well mechanical connection and flexibility, high transmittance and low sheet resistance. Besides, the addition of the conducting nanoparticles can help the enhancement of the optical coupling efficiency and the increment of the optical scattering level, so as to increase the viewing angle of the display panel and enhance the display efficiency.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
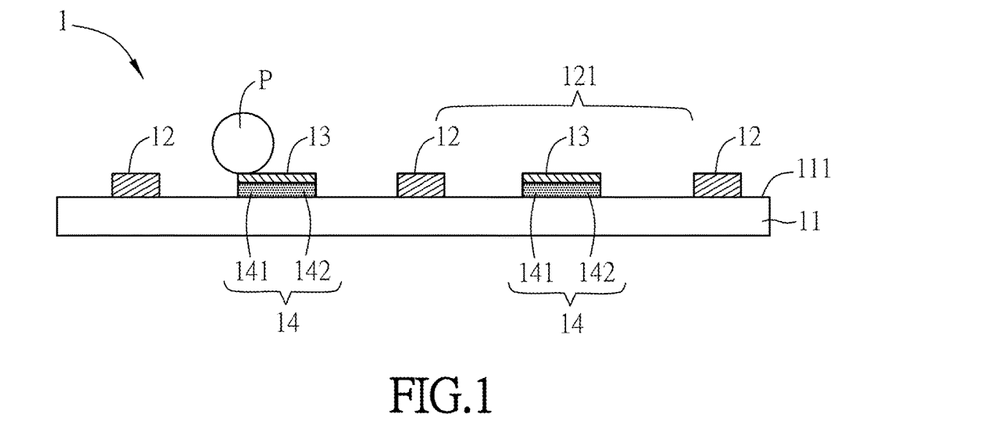
FIG. 1 is a schematic sectional diagram of an optoelectronic modulation stack of an embodiment of the invention.

FIG. 1 is a schematic sectional diagram of an optoelectronic modulation stack 1 of an embodiment of the invention. As shown in FIG. 1, the optoelectronic modulation stack 1 includes a substrate 11, a plurality of touch sensing units 12, at least a first anti-interference spot 13 and a nano-structural layer 14.

The substrate 11 can be a transparent substrate or an opaque substrate. The transparent substrate is, for example, a glass substrate, a plastic substrate or other kinds of substrates, and here the glass substrate is illustrated as an example. The substrate 11 can be a rigid substrate or a flexible substrate, and the substrate 11 can be applied to the flexible display when being a flexible substrate. In application, the substrate 11 can be a cover glass to reduce the thickness of the applied display panel, and the cover glass can have a curved edge to enhance the 3D display performance.

The touch sensing units 12 are coplanarly disposed on the substrate 11, and here they are disposed on a surface 111 of the substrate 11 to make the coplanar disposition. A first interval region 121 is formed between the adjacent touch sensing units 12. The touch sensing units 12 can be made by transparent conducting materials, such as indium tin oxide (ITO) or other metal oxides. The material of the touch sensing units 12 can be at least selected from the group consisting of ITO (Indium Tin Oxide), IGZO (Indium Gallium Zinc Oxide), IZO (Indium Zinc Oxide), AZO (Al-doped Zinc Oxide), GZO (Gallium-doped Zinc Oxide), CNT (Carbon Nanotube) or graphene. The adjacent touch sensing units 12 shown in FIG. 1 are electrically insulated from each other for example.

The first anti-interference spot 13 is disposed within the first interval region 121, and the width of the first anti-interference spot 13 is substantially less than that of the substrate 11 or touch sensing unit 12 (the dimensions shown in the figure are just for the illustrative purpose but not for representing the real ones). For example, the width of the first anti-interference spot 13 is less than one fifth the width of the substrate 11 or touch sensing unit 12. In practice, for reducing the technical steps, the first anti-interference spot 13 and the touch sensing units 12 can be made in the same process and have the same material. However, this invention is not limited thereto. Herein, the first anti-interference spot 13 is made by the conducting material and a distance exists between the first anti-interference spot 13 and the adjacent touch sensing unit 12. By disposing the first anti-interference spot 13 within the first interval region 121, the interval between the adjacent touch sensing units 12 (first interval region 121) can be increased. Therefore, even if the particles fall down or the scratch occurs, the adjacent touch sensing units 12 won't be short-circuited, so as to prevent the malfunction of the touch product and enhance the product yield. The above-mentioned particles come from, for example, the subsequent process which can at least include mechanical thinning process, chemical thinning process, chemical-mechanical thinning process, photolithography process, thin film deposition process and/or thin film etching process. By disposing the first anti-interference spot 13 within the first interval region 121 formed by the adjacent touch sensing units 12, the interval between the adjacent touch sensing units 12 can be enlarged. Thereby, the short circuit won't be caused even if the particle pollution or bent condition occurs, so as to provide the electrical anti-interference effect.

Besides, the touch sensing units 12 may make the human eyes perceive the existence of the touch sensing units 12, but because the first anti-interference spot 13 is disposed between the adjacent touch sensing units 12, the human eyes will not easily perceive the existence and therefore the display efficiency can be kept. For example, the width of the first anti-interference spot 13 is between 50 μm and 70 μm, and the width of the first interval region 121 is between 70 μm and 130 μm. In one embodiment, the material of the first anti-interference spot 13 can include metal oxide. Moreover, the first anti-interference spots 13 can include a massive spot or a bent spot. The first anti-interference spots 13 can exhibit a zigzag pattern.

The nano-structural layer 14 is disposed below the first anti-interference spot 13 and includes a plurality of nano structures. The nano-structural layer 14 can be directly or indirectly connected with the first anti-interference spot 13. Besides, the nano-structural layer 14 can be patterned or not. When the nano-structural layer 14 is patterned, the pattern thereof can be the same as the pattern of the first anti-interference spot 13. When the nano-structural layer 14 is not patterned, it can be a continuous flat layer. The nano-structural layer 14 and the first anti-interference spot 13 can be disposed on the same side or different sides of the substrate 11. Herein for example, the nano-structural layer 14 is patterned with the same pattern as the first anti-interference spot 13, which means both of them completely overlap each other, and they are disposed on the same side of the substrate 11. When the light passes through the nano structures 141 and the first anti-interference spot 13, the optical characteristic of the light is changed, for example, the mura, moire and haze are eliminated and the viewing angle is increased, so as to provide the optical anti-interference effect. Furthermore, the disposition of the nano-structural layer 14 also can prevent the short circuit to provide the electrical anti-interference effect even if the particles are caused during the process.

The nano structures 141 are nanoparticles or nanowires for example, and the material thereof can be nano silver, nano magnesium alloy or nano copper. The nanoparticles are conducting nanoparticles for example, and the material thereof includes ITO, IGZO, IZO, AZO, GZO, CNT or graphene. Moreover, the nano-structural layer 14, the first anti-interference spot 13 and/or the touch sensing unit 12 can be made by the composite material formed by the metal nanowires and the conducting nanoparticles added in the metal nanowires. The nano-structural layer 14 can be formed by, for example, printing, ink-jet printing, screen printing, coating, laser or photolithography process.

The nano-structural layer 14 can further include a medium 142, and the nano structures 141 are disposed in the medium 142. The medium 142 and the nano structures 141 can have different refractive indexes, so as to achieve such kind of optical purpose as optical diffusion. The medium can be polyvinyl alcohol or polyimide.

The following is an embodiment of the manufacturing method of the silver nanowires. First, the silver nanowire solution (Seashell Technology, AgNW-115) is spun for 60 seconds at a rate of 1000 r/min on a PET substrate to form a random distributed silver nanowire network, and the ITO nanoparticle solution is spun for 30 seconds at a rate of 2000 r/min on the silver nanowire network, and then the thermal annealing at about 100° C. is implemented to remove the solvent. The silver nanowire solution is diluted to the concentration of 1 mg/mL. The silver nanowire has the diameter of about 115 μm and the length of about 30 μm. The silver nanowire network having different sheet resistances and transmittances can be obtained by the repeated spin coating processes. The ITO nanoparticle solution is prepared by mixing the 30 wt. % ITO nanoparticles distributed in the isopropyl alcohol and the 2.5 wt. % polyvinyl alcohol (PVA) dissolved in the deionized water with the same volume as the isopropyl alcohol. By adding the distribution of the ITO nanoparticles into the PVA solution, the mechanical connection of the produced silver nanowire/ITO nanoparticle film can be enhanced.

The optoelectronic modulation stack 1 shown in FIG. 1 can have many variations, and some of them are illustrated in FIGS. 2 to 10 for example.

Figure 2:
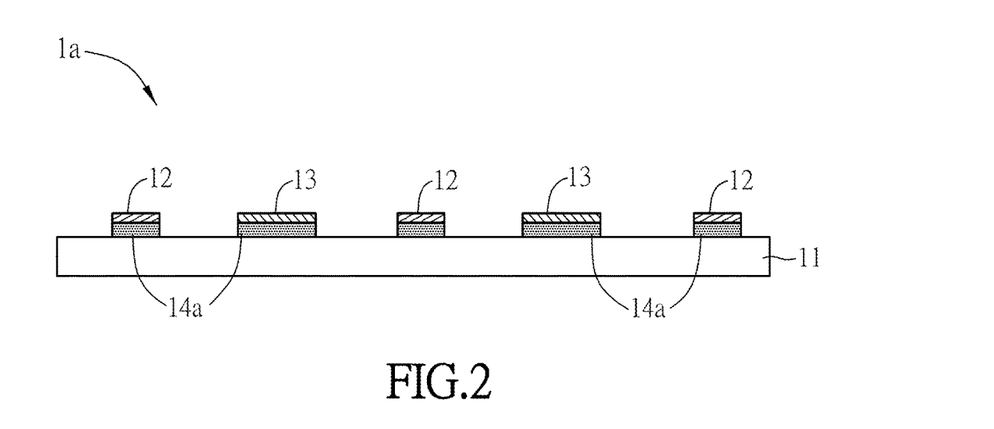
FIGS. 2 to 10 are schematic diagrams of the optoelectronic modulation stacks of different embodiments of the invention.

As shown in FIG. 2, the nano-structural layer 14a of the optoelectronic modulation stack 1a is disposed not only below the first anti-interference spot 13 but also below the touch sensing unit 12. In this embodiment, the pattern of the nano-structural layer 14a is the same as that of the combination of the first anti-interference spots 13 and the touch sensing units 12.

Figure 3:
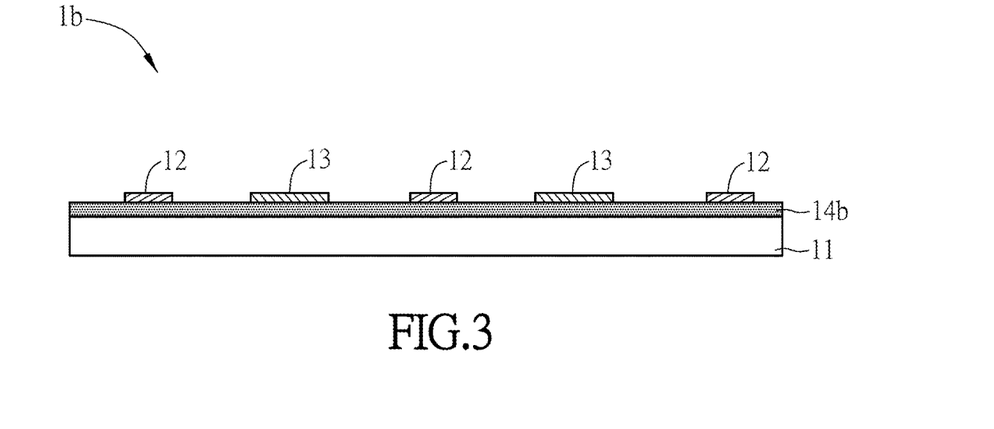

As shown in FIG. 3, the nano-structural layer 14b of the optoelectronic modulation stack 1b is not patterned and here is a continuous flat layer.

Figure 4:
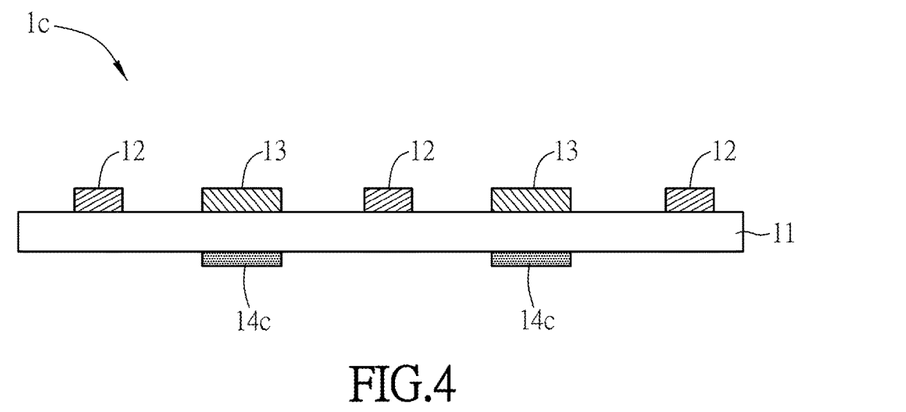

As shown in FIG. 4, the nano-structural layer 14c of the optoelectronic modulation stack 1c is disposed below the first anti-interference spot 13, and they are disposed on the opposite sides of the substrate 11.

Figure 5:
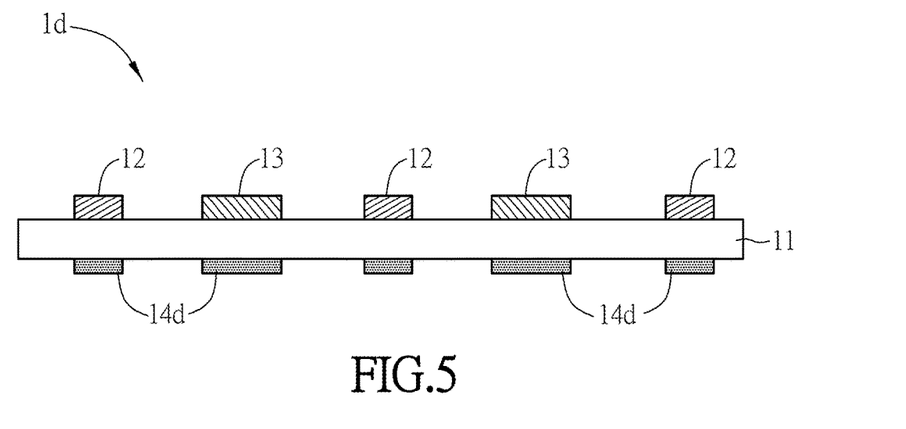

As shown in FIG. 5, the nano-structural layer 14d of the optoelectronic modulation stack 1d is disposed below the first anti-interference spot 13, and they are disposed on the opposite sides of the substrate 11. Besides, the nano-structural layer 14d is also disposed below the touch sensing unit 12.

Figure 6:
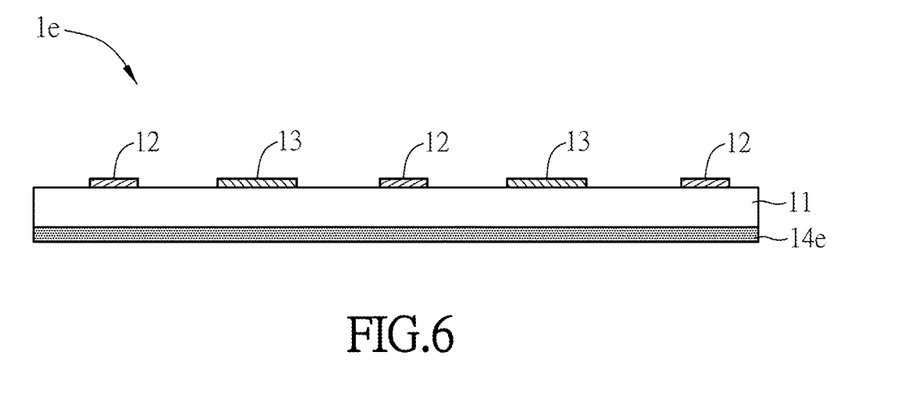

As shown in FIG. 6, the nano-structural layer 14e of the optoelectronic modulation stack 1e is disposed below the first anti-interference spot 13, and they are disposed on the opposite sides of the substrate 11. Besides, the nano-structural layer 14e is not patterned and here is a continuous flat layer.

Figure 7:
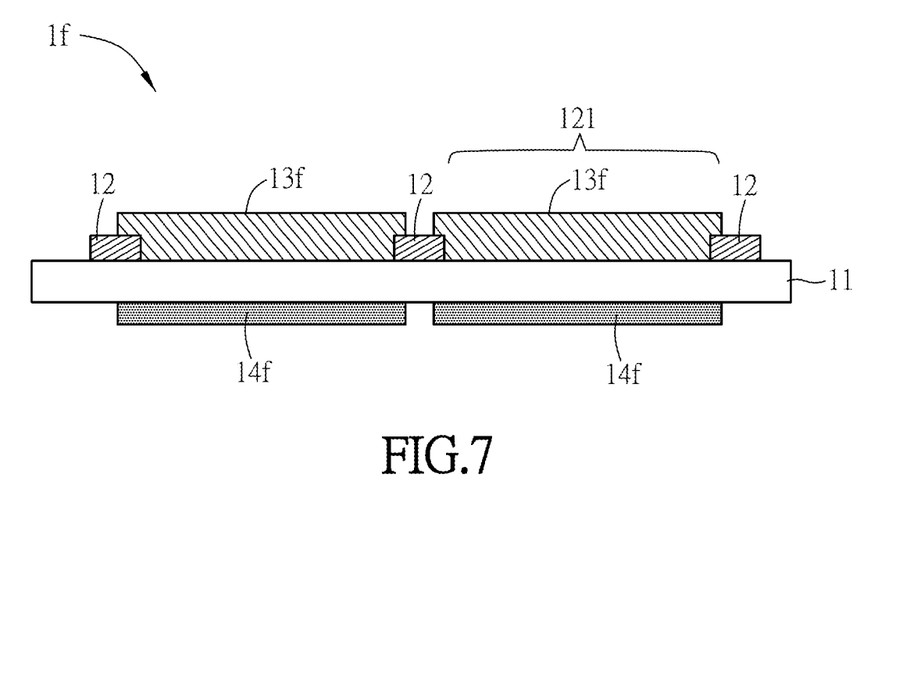

FIG. 7 is a schematic diagram of an optoelectronic modulation stack 1f of another embodiment of the invention. As shown in FIG. 7, the main difference between the optoelectronic modulation stacks 1f and 1 is that the first anti-interference spot 13f not only is disposed in the first interval region 121 but also covers at least a part of the touch sensing units 12 and is filled into the first interval region 121. Herein, the first anti-interference spot 13f is made by the insulating material such that the touch sensing units 12 won't be short-circuited. The first anti-interference spot 13f can be made by the transparent material so as to be pervious to the light. Moreover, the nano-structural layer 14f and the first anti-interference spots 13f are disposed on the opposite sides of the substrate 11, and the nano-structural layer 14f and the first anti-interference spots 13f have the same pattern.

Figure 8:
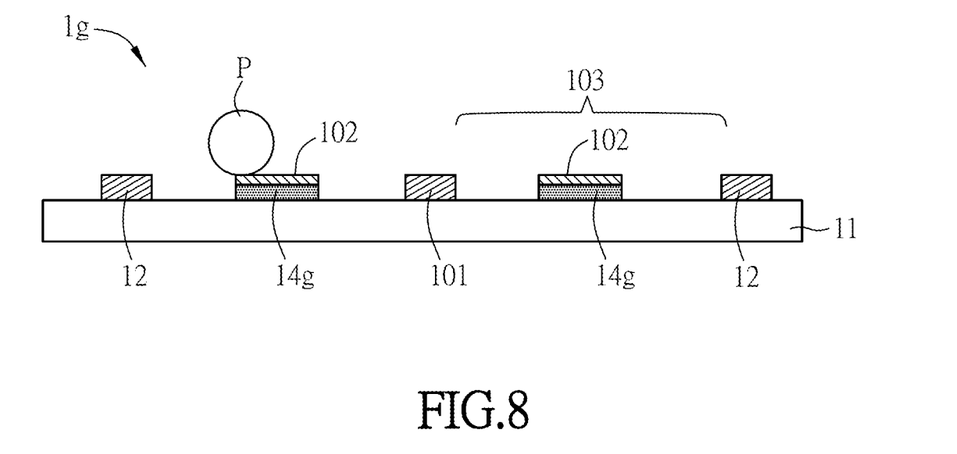

FIG. 8 is a schematic diagram of an optoelectronic modulation stack 1g of another embodiment of the invention. As shown in FIG. 8, the main difference between the optoelectronic modulation stacks 1g and 1 is that the optoelectronic modulation stack 1g further includes a grounding unit 101 and at least a second anti-interference spot 102. The grounding unit 101 is disposed coplanarly with the touch sensing units 12, and the grounding unit 101 and the adjacent touch sensing unit 12 have a second interval region 103 therebetween. The second anti-interference spot 102 is disposed within the second interval region 103, and the width of the second anti-interference spot 102 is substantially less than that of the substrate 11 or touch sensing unit 12. For example, the width of the second anti-interference spot 102 is less than one fifth the width of the substrate 11 or touch sensing unit 12. Likewise, in practice, for reducing the technical steps, the second anti-interference spot 102 and the touch sensing units 12 can be made in the same process and have the same material. However, this invention is not limited thereto. Herein, the second anti-interference spot 102 is made by the conducting material and is electrically floating. By disposing the second anti-interference spot 102 within the second interval region 103, the interval between the touch sensing unit 12 and the grounding unit 101 (second interval region 103) can be increased. Therefore, even if the particles fall down or the scratch is caused, the touch sensing unit 12 and the adjacent grounding unit 101 won't be short-circuited, so as to prevent the malfunction of the touch product and enhance the product yield. Besides, the touch sensing unit 12 and the grounding unit 101 may make the human eyes perceive their existence, but because the second anti-interference spot 102 is disposed between the touch sensing unit 12 and the adjacent grounding unit 101, the human eyes will not easily perceive the existence so that the display efficiency can be kept. For example, the width of the second anti-interference spot 102 is between 50 μm and 70 μm, and the width of the second interval region 103 is between 70 μm and 130 μm.

Moreover, the nano-structural layer 14g is further disposed below the second anti-interference spot 102, and they are disposed on the same side of the substrate 11 and have the same pattern in this embodiment.

Figure 9:
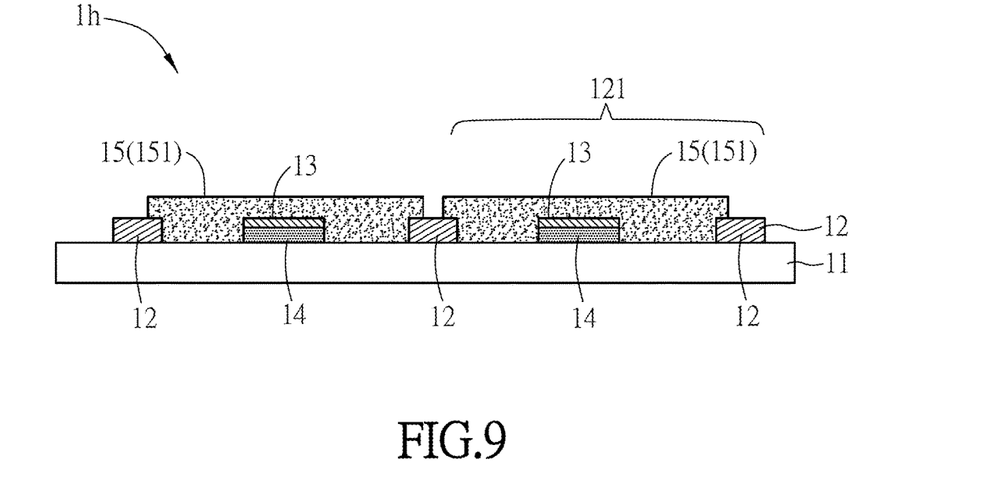

FIG. 9 is a schematic diagram of an optoelectronic modulation stack 1h of another embodiment of the invention. As shown in FIG. 9, the main difference between the optoelectronic modulation stacks 1h and 1 is that the optoelectronic modulation stack 1h further includes a color filter layer 15. The color filter layer 15 includes a plurality of filter bodies 151. The filter bodies 151 are disposed in the first interval regions 121 correspondingly, and each of the filter bodies 151 covers the first anti-interference spot 13, the nano-structural layer 14 and a part of the touch sensing unit 12. By the disposition of the color filter layer 15, the optoelectronic modulation stack 1h of this embodiment can be applied to the color display panel.

Figure 10:
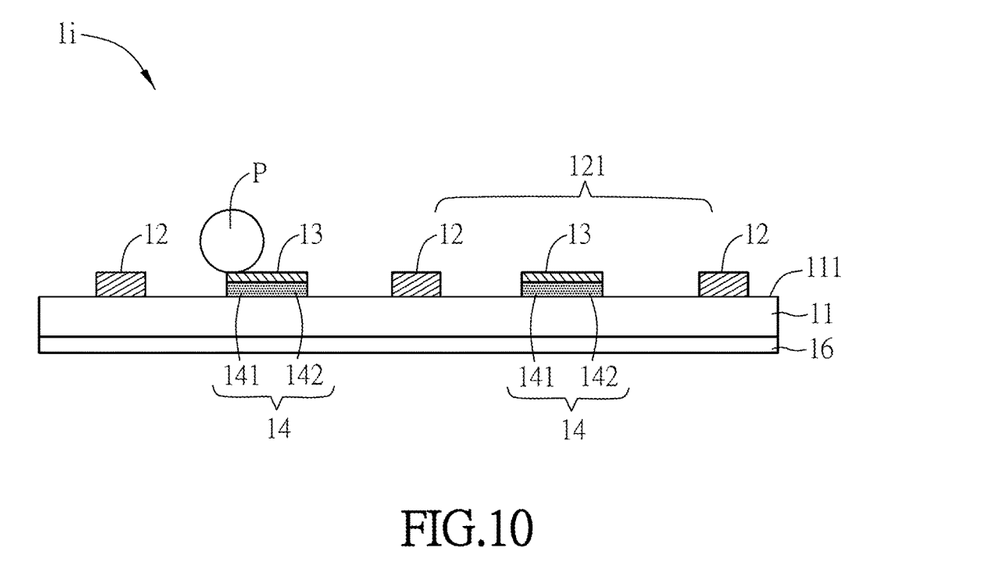

FIG. 10 is a schematic diagram of an optoelectronic modulation stack 1i of another embodiment of the invention. As shown in FIG. 10, the main difference between the optoelectronic modulation stacks 1i and 1 is that the optoelectronic modulation stack 1i can further include an insulating layer 16 which possesses the anti-glare ability. The insulating layer 16 can be disposed at some location of the substrate according to the requirement. For example, the insulating layer 16 and the touch sensing units 12 can be disposed on the same side or opposite sides of the substrate 11, and the latter case is illustrated as an example herein. Besides, the insulating layer 16 can be patterned or not, and here it is not patterned for example.

In one embodiment, the manufacturing method of the insulating layer 16 includes the following steps of: forming a plurality of electrodes on the substrate; coating the substrate having the electrodes with a non-optical-rotation-sensitive anti-glare polyimide precursor layer; implementing a first prebake to the substrate coated with the anti-glare polyimide precursor layer; forming a photoresist layer on the anti-glare polyimide precursor layer by coating; implementing a second prebake to the substrate coated with the anti-glare polyimide precursor layer and the photoresist layer; implementing an exposure by photomask; implementing a development to the photoresist material to form the patterned photoresist layer; etching the anti-glare polyimide precursor layer to form the patterned anti-glare polyimide precursor layer; stripping the photoresist layer; and baking the substrate having the anti-glare polyimide precursor layer to cross-link and harden the anti-glare polyimide so as to form the patterned anti-glare polyimide insulating layer. Since the polyimide has better thermal stability, mechanical stability, electrical stability and optical stability, the applied display panel also can have better stability with a longer lifespan.

To be noted, the technical features of the above embodiments can be used separately or together. Besides, any of the above-mentioned optoelectronic modulation stacks can be applied to any kind of the display panel.

Summarily, in the optoelectronic modulation stack of this invention, the first anti-interference spot is disposed in the first interval region formed by the adjacent touch sensing units, and thereby the interval between the touch sensing units is increased, for example, to 70 μm~130 μm from the original 10 μm~30 μm. Hence, even if the particles fall down or the scratch is caused during the process, the adjacent touch sensing units won't be short-circuited. Therefore, the first anti-interference spots provide the electrical anti-interference effect, so as to prevent the malfunction of the touch product and enhance the product yield and flexibility.

Furthermore, the increased interval between the touch sensing units may make the human eyes perceive the existence of the touch sensing units, but because the first anti-interference spot with a zigzag pattern is disposed between the adjacent touch sensing units, the touch sensing units will become invisible and the human eyes will not easily perceive their existence, so as to provide the optical anti-interference effect and enhance the display efficiency. Besides, the first anti-interference spots combined with the curved edge of the substrate can further enhance the optical anti-interference effect and the 3D display efficiency can be enhanced thereby.

Moreover, when the light emitted by the display module passes through the nano-structural layer and the anti-interference spots, the optical characteristic of the light is changed due to the disposition of the nano-structural layer, wherein for example, the mura, moire and haze are eliminated and the viewing angle is increased, so as to provide the optical anti-interference effect and also prevent the short circuit to provide the electrical anti-interference effect even if the particles are caused during the process.

In addition, the insulating layer of this invention possesses the anti-glare ability so as to absorb and filter the external incident light to reduce the reflection and interference effect caused by the incident light and the metal mesh, and therefore the brightness contrast of the display panel can be enhanced and the anti-glare effect against the external incident light can be achieved.

Moreover, by using the nanomaterial, this invention has advantages such as low wire junction resistance, smooth surface, well mechanical connection and flexibility, high transmittance and low sheet resistance. Besides, the addition of the conducting nanoparticles can help the enhancement of the optical coupling efficiency and the increment of the optical scattering level, so as to increase the viewing angle of the display panel and enhance the display efficiency.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optoelectronic modulation stack, comprising:
   a substrate;
   a plurality of touch sensing units coplanarly disposed on the substrate, wherein a first interval region is formed between the adjacent touch sensing units;
   at least one first anti-interference spot disposed within the first interval region, wherein the width of the first anti-interference spot is substantially less than that of the substrate or one of the plurality of touch sensing units, and the at least one first anti-interference spot and the plurality of touch sensing units have the same material; and
   a nano-structural layer disposed below the at least one first anti-interference spot and having a plurality of nano structures, wherein at least a part of the nano-structural layer is disposed directly below the at least one first anti-interference spot;
   wherein when a light passes through the plurality of nano structures and the at least one first anti-interference spot, the optical characteristic of the light is changed.

2. The optoelectronic modulation stack as recited in claim 1, wherein the at least one first anti-interference spot exhibits a zigzag pattern.

3. The optoelectronic modulation stack as recited in claim 1, further comprising: an insulating layer possessing the anti-glare ability.

4. The optoelectronic modulation stack as recited in claim 1, wherein the substrate is a flexible substrate or a rigid substrate.

5. The optoelectronic modulation stack as recited in claim 1, wherein the plurality of nano structures are nanoparticles or nanowires.

6. The optoelectronic modulation stack as recited in claim 1, wherein the nano-structural layer further includes a medium where the plurality of nano structures are disposed.

7. The optoelectronic modulation stack as recited in claim 6, wherein the medium and the plurality of nano structures have different refractive indexes.

8. The optoelectronic modulation stack as recited in claim 6, wherein the medium is polyvinyl alcohol or polyimide.

9. The optoelectronic modulation stack as recited in claim 6, wherein the nano-structural layer is formed by printing, inkjet printing, screen printing, coating, laser or photolithography process.

10. The optoelectronic modulation stack as recited in claim 1, wherein the materials of the at least one first anti-interference spot and the plurality of touch sensing units are transparent conducting materials.

11. The optoelectronic modulation stack as recited in claim 10, wherein the materials of the at least one first anti-interference spot and the plurality of touch sensing units are at least selected from a group consisting of ITO, IGZO, IZO, AZO, GZO, CNT and graphene.

12. The optoelectronic modulation stack as recited in claim 1, further comprising a color filter layer.

13. The optoelectronic modulation stack as recited in claim 1, wherein the width of the at least one first anti-interference spot is between 50 μm and 70 μm.

14. The optoelectronic modulation stack as recited in claim 1, further comprising a grounding unit and at least one second anti-interference spot, wherein a second interval region is formed between the grounding unit and the touch sensing unit adjacent to the grounding unit, the at least one second anti-interference spot is disposed within the second interval region.

15. The optoelectronic modulation stack as recited in claim 14, wherein the at least one second anti-interference spot is made by a conducting material and is electrically floating.

16. The optoelectronic modulation stack as recited in claim 1, wherein the nano-structural layer and the at least one first anti-interference spot are disposed on a same side of the substrate, and the nano-structural layer is disposed below the plurality of touch sensing units.

17. The optoelectronic modulation stack as recited in claim 16, wherein the nano-structural layer is a continuous flat layer.

18. The optoelectronic modulation stack as recited in claim 1, wherein the at least one first anti-interference spot and the nano-structural layer are disposed respectively on opposite sides of the substrate.

19. The optoelectronic modulation stack as recited in claim 18, wherein the nano-structural layer is disposed below the plurality of touch sensing units.

20. The optoelectronic modulation stack as recited in claim 19, wherein the nano-structural layer is a continuous flat layer.

* * * * *